E. K. BAKER.
DEMOUNTABLE RIM FOR AUTOMOBILE WHEELS.
APPLICATION FILED MAR. 10, 1914.
1,140,652.
Patented May 25, 1915.
2 SHEETS—SHEET 1.
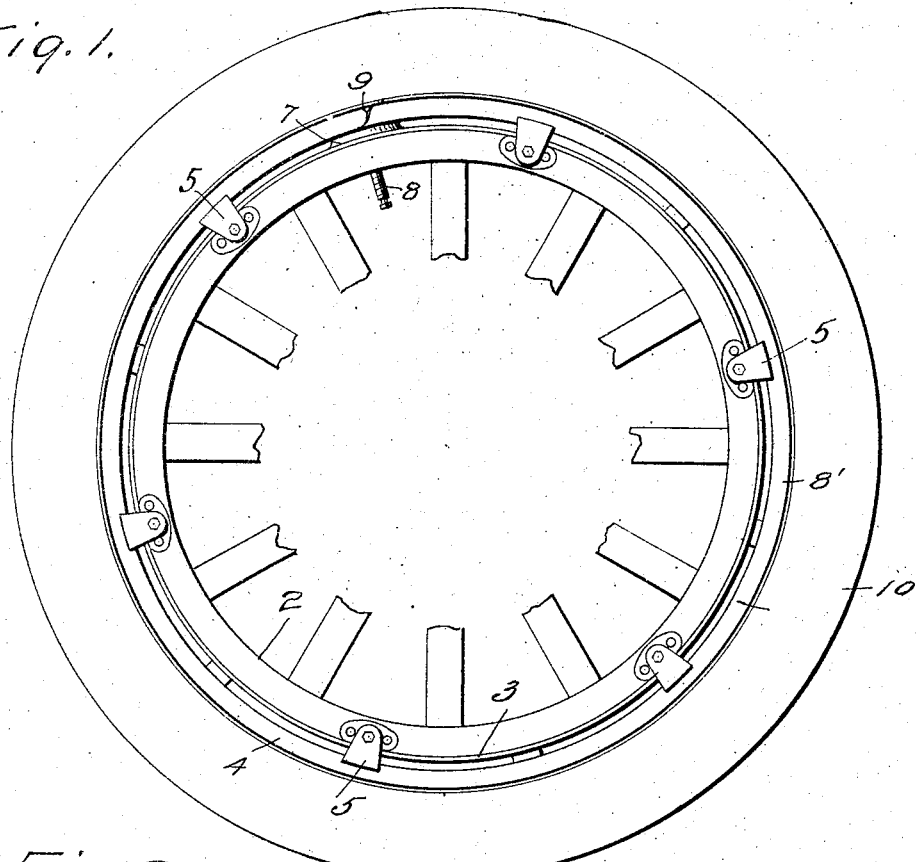
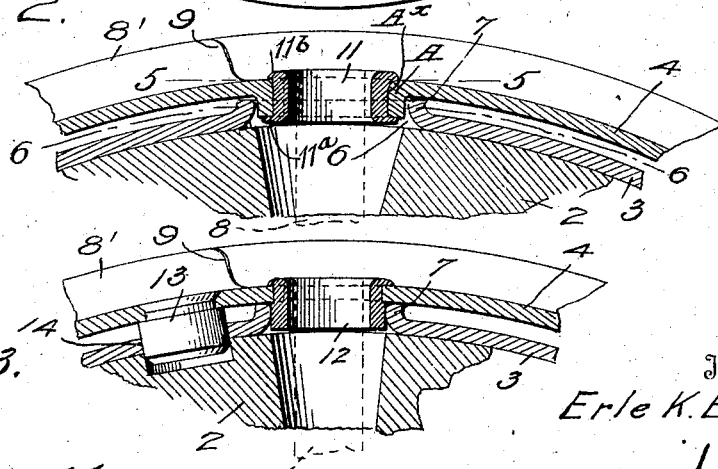
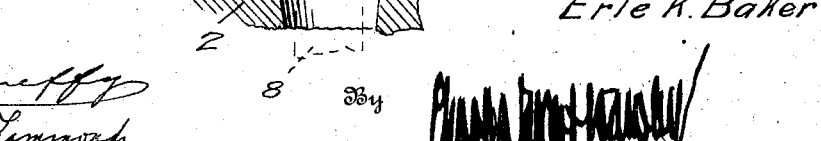
Inventor
Erle K. Baker E. K. BAKER.
DEMOUNTABLE RIM FOR AUTOMOBILE WHEELS.
APPLICATION FILED MAR. 10, 1914.
1,140,652.
Patented May 25, 1915.
2 SHEETS—SHEET 2.
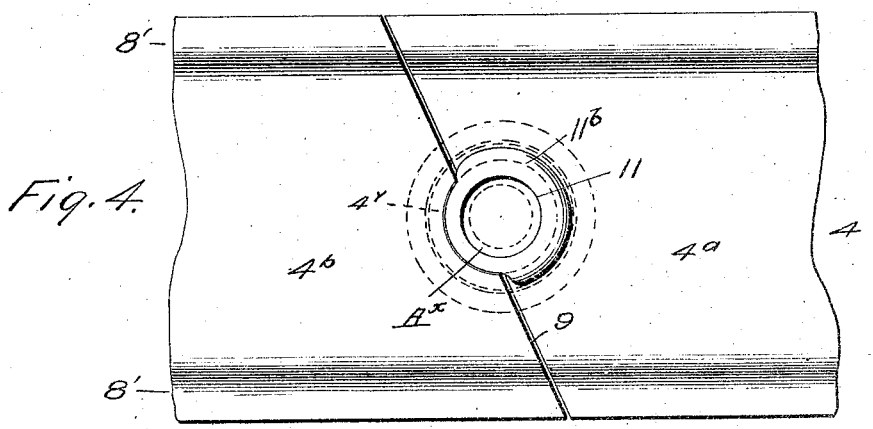
Fig. 4.
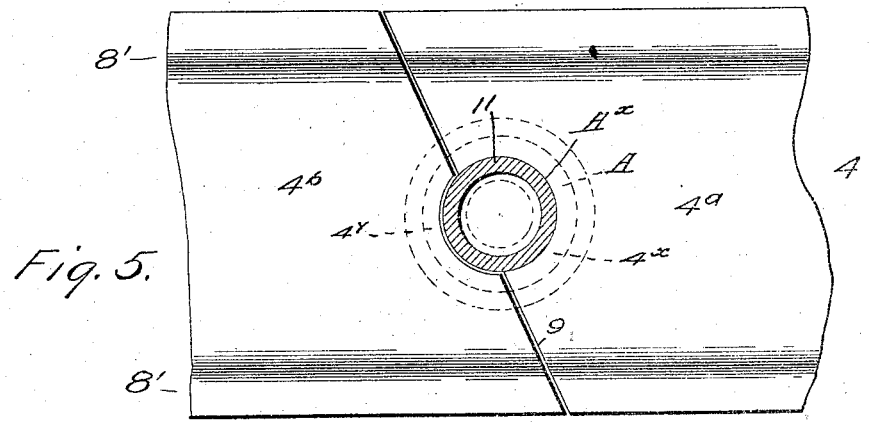
Fig. 5.
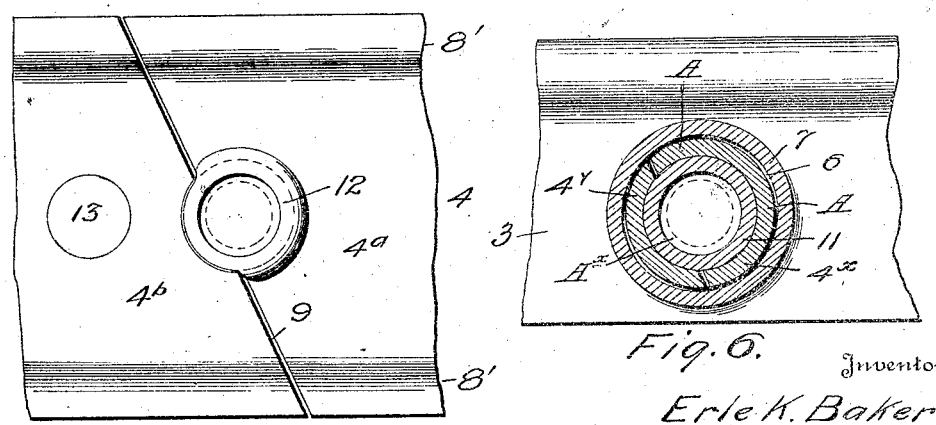
Fig. 7.        Fig. 6.
Inventor
Erle K. Baker
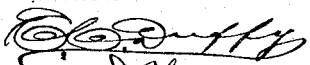
Witnesses
By
Attorney

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE RIM FOR AUTOMOBILE-WHEELS.

1,140,652. Specification of Letters Patent. Patented May 25, 1915.

Application filed March 10, 1914. Serial No. 823,806.

*To all whom it may concern:*

Be it known that I, ERLE K. BAKER, a citizen of the United States, and a resident of Chicago, county of Cook, and State of Illinois, have invented certain new and useful Improvements in Demountable Rims for Automobile-Wheels, of which the following is a specification.

My invention relates to demountable tire-carrying rim constructions for automobile wheels, and has special reference to improvements in and upon demountable rims of the transversely split and bolted-on type.

An object of my invention is to provide a demountable rim of more simple construction and of lower cost than any now in use, which more easily may be placed in and taken from a pneumatic tire; and which may be used interchangeably upon most automobile wheels now in use.

A further object of my invention is to dispense with the many parts which are now used to connect the ends of such a rim and in place thereof substitute a construction which preferably shall serve all the purposes of a spacer, a connector, an aliner, a driver, and a valve stem container, whereby the construction of the rim may be greatly simplified while maintaining at maximum the necessary qualities of strength, rigidity, durability, safety, efficiency and ease of operation.

My invention resides in the novel constructions and combinations of parts hereinafter described and more particularly pointed out in the appended claims and will be more readily understood by reference to the accompanying drawings forming a part of the specification, and in which—

Figure 1 is a side view of an automobile wheel equipped with a pneumatic tire mounted upon a demountable rim embodying my invention; Fig. 2 is an enlarged vertical and longitudinal section of the wheel, rim and tire, adjacent the valve stem; Fig. 3, is a similar sectional view illustrating a modified form of my invention; Fig. 4, is an outer side view of the rim ends of the accompanying structure illustrated in Figs. 1 and 2; Fig. 5, is a sectional view on the line 5—5 of Fig. 2; Fig. 6, is a sectional view on the line 6—6 of Fig. 2; and, Fig. 7, is an outer side view of the rim ends and accompanying parts shown in Fig. 3.

In these drawings I have shown a typical automobile wheel having a wooden felly 2 and a metal felly band 3. The latter may be provided with the usual inner-side flange or other projections (not shown) against which the rim 4 is thrust and held by bolt-actuated wedge-lugs 5, of usual construction. My invention is not limited to the combination of the metal felly band and wooden felly, for an all-metal construction of the same general form and purpose may be substituted; and where the words "felly band" appear hereinafter they are used in this inclusive sense.

The felly band, as well shown in Fig. 2, is provided with a large valve-stem-opening 6, surrounded by an upstanding or outstanding flange 7 formed from the felly band itself. This flange 7 constitutes a spacer upon which the rim rests as shown in Figs. 1, 2 and 3. The hole 6 is considerably larger than the valve stem 8 to permit the easy placement of the stem and rim on the wheel. Most automobile wheels of present day construction which carry rim securing wedge-lugs, have valve holes thus proportioned to the valve stem. The demountable rim, as here shown, has integral flanges 8', 8' shaped to receive a straight-side pneumatic tire. In lieu of such flanges, integral clencher flanges may be used. And one or both flanges of the rim may be detachable from the body of the rim in well known manner, and not affect the operation or utility of the herein described invention. The rim 4 is split or cut apart at one point on a transverse line. Thus, 9 represents the split in the rim, and 4ᵃ is one end of the rim and 4ᵇ the other. I prefer a diagonal split, as shown in Figs. 4, 5 and 7, the same being of the kind and for the purpose set forth in application Serial No. 502,069, filed June 14, 1909.

The tire 10 is seated on the rim 4 and it is customary to keep the tire inflated thereon whether or not the rim is in position on the wheel. The pressure of the inflated tire tends to collapse the rim. The pressure of the wedge-lugs tends to expand the rim. To overcome both tendencies I employ a construction at the split 9 in the rim, which as about to be described, preferably and conveniently serves many purposes.

I first make an endless rim 4 of desired cross section. Then I punch a hole therein and form or press a circular flange A from the body of the rim around said hole. In this manner I provide an annular driver upon the inner periphery of the rim. This driver or integral sleeve is of a size to fit within the spacer and valve stem hole projection 7 of the felly band, as shown in Fig. 2, and therefore serves to hold the rim against rotation on the wheel when placed thereon and secured by the wedge-lugs 5. The hole $A^x$ within the driver is considerably larger than a valve stem to allow room for a valve stem container or bushing 11 about to be described. Having formed this integral driver flange A on the rim, I then saw or otherwise cut the rim apart on a line that intersects the opening $A^x$. The cut, obviously, divides the flange into a major part $4^x$ on the end $4^a$ of the rim and a minor part $4^y$ on the rim end $4^b$. But this division of the flange does not lessen its usefulness as a driver when the two parts are confined in the valve stem hole 6 of the felly band. On the contrary the divided flange takes on another function; that is, when thus confined the two parts serve to lock the rim ends $4^a$, $4^b$ together and in alinement.

As it is desirable to protect the valve stem when the rim ends are separated, as in placing the rim in and taking it from a tire, I prefer to add a member 11 which will provide the protection and at the same time serve as an interlock between the rim ends, to hold them in alinement. This member 11, as shown, is a short sleeve or bushing preferably somewhat longer than the integral sleeve A and which I swage or weld within the part $4^x$ but not in the minor part $4^y$. Thus I provide a projection $11^a$ on the rim end $4^a$ that fits the recess in the part $4^y$. In this manner the rim ends are separably but effectually interlocked and held in alinement against forces tending to disaline them while off the wheel. The relations of the several parts are clearly shown in Figs. 2, 4, 5 and 6. If desired the swage burs $11^a$, $11^b$ upon the bushing may be removed where they lap upon the rim end $4^b$, as indicated in Fig. 4, but in most cases it is desirable to merely blunt them and leave them to interlock with the exposed ends of the bushing, as indicated in Fig. 2. The bushing is large enough to loosely contain the valve stem, see dotted lines Fig. 2, and being positioned directly at the split in the rim it is obvious that the spreader (not shown) of the valve stem bridges both the bushing and the split and protects the inner tube (not shown) of the tire from both.

To disengage the ends of the rim for the purpose of removing it from or placing it in a tire, it is only necessary to force the end $4^y$ past the interlocking bushing in a transverse direction or to force the end $4^y$ inward, toward the center of the rim, and out of engagement with the bushing. Thereafter the rim ends may be laterally separated or overlapped as far as may be needed, according to the method pursued in placing and removing the rim.

Where there is no objection to a two-part driver and two holes in the felly band I dispense with the flange A and put a bushing 12 in a divided hole in the rim as shown in Figs. 3 and 7. In each case the bushing enters the hole 6 in the felly band, as one part of the driver and a second driver stud 13, on the other end of the rim enters a second hole 14 in the felly band.

As used in the appended claims the word "rim" means—a suitably flanged, tire-carrying, demountable wheel rim; and, the word "transplit" means—transversely split—containing a transverse split.

While I have illustrated and described my invention in accordance with the patent statutes, I desire it to be understood that the details of construction may be materially varied and that various changes, modifications and substitutions may be made in the demountable rim herein illustrated without departing from the spirit and scope of my invention as set forth in the appended claims.

Having thus described my invention, I claim as new and desire to secure by Letters Patent:

1. A transplit rim having in one end a hole which opens into the split in the rim, in combination with a rim-end interlocking member in said hole and permanently fastened to one end of the rim.

2. A transplit rim having in one end a hole which opens into the split of the rim, in combination with a rim-end interlocking member and driver in said hole and rigidly fixed to one end of the rim.

3. A transplit rim containing a hole which opens into the split of the rim, in combination with a member occupying said hole fixed to one end of the rim and interlocking the rim ends against accidental lateral displacement, and means on and integral with the rim ends for fastening said ends together.

4. A transplit rim containing a hole which opens into the split of the rim, in combination with a rim-end interlocking and valve-stem containing member occupying said hole and rigidly fixed to one end of the rim.

5. A transplit rim containing a hole which is segmentally intersected by and forms a part of the split of the rim, in combination with an interlocking member secured in the major part of said hole and having shoulders or flanges that radially interlock with the opposed end of the rim.

6. A transplit rim containing a hole which is segmentally intersected by and forms a part of the split in the rim, in combination with a valve-stem bushing secured in the major part of said hole and normally also occupying the minor part thereof.

7. A transplit rim containing a hole which is segmentally intersected by and forms a part of the split in the rim, in combination with a rim-end interlocking member secured in the major part of said hole.

8. A transplit rim containing a hole which is intersected by and forms a part of the split in the rim, in combination with a rim-end interlocking member containing a valve stem opening and secured in one part of said hole on one end of the rim.

9. A transplit rim containing a hole which is segmentally intersected by and forms a part of the split in the rim, in combination with a valve stem bushing secured in the major part of said hole and having shoulders or flanges that radially interlock with the opposed end of the rim.

10. A transplit rim containing a hole which is intersected by the split of the rim and having driver flanges formed around said hole on opposite ends of the rim.

11. A transplit rim containing a hole which is intersected by the split of the rim and having driver flanges formed around said hole on opposite ends of the rim, in combination with a valve stem bushing secured in one part of said hole.

12. A transplit rim containing a hole which is intersected by the split of the rim and having integral driver flanges formed around said hole on opposite ends of the rim, in combination with a valve stem bushing secured in one part of said hole and both transversely and radially interlocking the opposed end of the rim.

13. A felly band containing a valve stem hole, in combination with a transplit rim having an integral annular flange divided by the split and occupying the hole in the felly band and securing the rim against expansion on the felly band.

14. A felly band which is outwardly flanged about its valve stem hole, in combination with a transplit rim containing a hole which is intersected by the split of the rim and having a driver flange formed around said hole on opposite ends of the rim and fitting the hole in the felly band.

15. A felly band containing a valve stem hole, in combination with a transplit rim having an integral flange divided by the split and occupying the hole in the felly band to secure the rim against expansion thereon, and a valve stem bushing secured in one part of said flange and interlocking with the other.

16. A felly band containing a valve stem hole, in combination with a transplit rim having an integral annular flange divided by the split into major and minor parts together occupying the hole in the felly band to secure the rim against expansion thereon, and a valve stem bushing secured in the major part of said flange and interlocking with the minor part.

17. A felly band having an annular spacer projection containing a valve stem hole, in combination with a transplit rim having an annular driver upon its ends, the same being divided at the split of the rim, and occupying the hole in the felly band to secure the rim against expansion on the felly band.

18. A felly band having an annular spacer projection containing a valve stem hole, in combination with a transplit rim having an annular driver upon its ends, the same being divided at the split of the rim, and occupying the hole in the felly band to secure the rim against expansion on the felly band, and a valve stem bushing secured in one part of said driver.

19. A transplit rim containing a hole intersected by its split and having driver projections upon its inner periphery at each side of said hole to co-act with the valve stem hole in a felly band.

20. A transplit rim containing a hole intersected by its split and having driver projections upon its inner periphery at each side of said hole to co-act with the valve stem hole in the felly band, and means for interlocking the rim ends in alinement.

In testimony whereof, I have hereunto set my hand, this 5th day of March, 1914, in the presence of two subscribing witnesses.

ERLE K. BAKER.

Witnesses:
N. CURTIS LAMMOND,
JAMES S. DODGE, Jr.